US012066160B2

(12) United States Patent
Maier

(10) Patent No.: US 12,066,160 B2
(45) Date of Patent: Aug. 20, 2024

(54) OPTICAL DEVICE FOR MOTOR VEHICLE HEADLIGHT

(71) Applicant: ZKW Group GmbH, Wieselburg (AT)

(72) Inventor: Christian Maier, Oberndorf an der Melk (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/128,533

(22) Filed: Mar. 30, 2023

(65) Prior Publication Data

US 2023/0313960 A1 Oct. 5, 2023

(30) Foreign Application Priority Data

Apr. 5, 2022 (EP) .................................... 22166713

(51) Int. Cl.
*F21S 41/33* (2018.01)
*F21S 41/125* (2018.01)
(Continued)

(52) U.S. Cl.
CPC ........... *F21S 41/337* (2018.01); *F21S 41/125* (2018.01); *F21S 41/24* (2018.01); *F21W 2102/20* (2018.01); *F21W 2107/10* (2018.01)

(58) Field of Classification Search
CPC .......... F21S 41/24; F21S 41/25; F21S 41/337; F21S 43/14; F21S 43/236; F21S 43/241;
(Continued)

(56) References Cited

U.S. PATENT DOCUMENTS

| | | | |
|---|---|---|---|
| 9,261,254 | B2 | 2/2016 | de Lamberterie et al. |
| 10,895,361 | B1 | 1/2021 | Crespin et al. |

(Continued)

FOREIGN PATENT DOCUMENTS

| | | | |
|---|---|---|---|
| DE | 102010013931 | A1 | 10/2011 |
| DE | 102014218991 | A1 | 3/2016 |
| DE | 102015213827 | A1 | 1/2017 |

OTHER PUBLICATIONS

Search Report for European Patent Application No. 22166713.2, dated Sep. 16, 2022 (5 Pages).

*Primary Examiner* — Zheng Song
(74) *Attorney, Agent, or Firm* — Eversheds Sutherland (US) LLP

(57) ABSTRACT

An optical device for a motor vehicle headlight for producing continuously closed light distribution. The optical device includes: light sources; collimators which are respectively associated with a light source; and a light guiding body, which has a light shaping structure and is formed from a plurality of interconnected facets. The facets respectively have an inclination to the main emission direction, wherein the spatial vector of a facet forms a horizontal and a vertical angle of inclination to the main emission direction. The inclinations of all facets are distributed such that the horizontal angles of inclination are respectively distributed around an expected value that corresponds to the maximum luminous intensity of the light distribution such that light that enters or leaves the light guiding body via facets that have horizontal and vertical angles of inclination corresponding to the expected value forms the maximum luminous intensity of the light distribution. The light shaping structure forms the light entry side and/or the light exit side of the light guiding body, wherein the facets are distributed substantially homogeneously on the light entry and/or exit sides in relation to their respective inclinations.

20 Claims, 3 Drawing Sheets

(51) Int. Cl.
*F21S 41/24* (2018.01)
*F21W 102/20* (2018.01)
*F21W 107/10* (2018.01)

(58) Field of Classification Search
CPC ........ F21S 43/243; F21S 43/249; F21S 43/26; F21W 2102/20; F21W 2107/10
See application file for complete search history.

(56) References Cited

U.S. PATENT DOCUMENTS

| | | | | |
|---|---|---|---|---|
| 2005/0007793 | A1* | 1/2005 | Yoshida | G02B 6/0053 362/558 |
| 2007/0147041 | A1* | 6/2007 | Shiratsuchi | F21V 5/008 362/268 |
| 2012/0033441 | A1* | 2/2012 | Sousek | F21S 43/14 362/555 |
| 2013/0021815 | A1* | 1/2013 | Koizumi | F21S 43/249 362/511 |
| 2014/0071703 | A1 | 3/2014 | Motomura | |
| 2014/0092619 | A1* | 4/2014 | Bushre | F21S 41/40 362/520 |
| 2015/0355470 | A1* | 12/2015 | Herschbach | F21V 5/08 362/11 |
| 2016/0265733 | A1* | 9/2016 | Bauer | F21S 41/16 |
| 2018/0313505 | A1* | 11/2018 | Gao | F21S 41/24 |
| 2019/0162382 | A1* | 5/2019 | Kang | F21S 43/31 |
| 2019/0264886 | A1* | 8/2019 | Sousek | F21S 43/31 |
| 2019/0301699 | A1* | 10/2019 | Fischer | F21S 41/285 |
| 2019/0301705 | A1* | 10/2019 | Schickel | G02B 19/0028 |
| 2022/0034465 | A1* | 2/2022 | Lee | F21S 41/43 |
| 2022/0325867 | A1* | 10/2022 | Chen | F21S 43/315 |

* cited by examiner

OPTICAL DEVICE FOR MOTOR VEHICLE HEADLIGHT

CROSS-REFERENCE TO RELATED APPLICATIONS

This application claims priority to European Patent Application No. 22166713.2, filed Apr. 5, 2022, which is incorporated herein by reference.

FIELD OF THE INVENTION AND DESCRIPTION OF PRIOR ART

The invention relates to an optical device for a motor vehicle headlight for producing continuously closed light distribution, in particular daytime running light distribution, turn signal light distribution and/or tail light distribution, which light distribution has a maximum luminous intensity, wherein the optical device comprises the following:

- light sources, which are designed to emit light in the light emission direction,
- collimators, which are connected downstream of the light sources in the light emission direction, wherein one collimator is respectively associated with one light source and is designed to direct the light of the light source associated with the respective collimator parallel to a main emission direction,
- one light guiding body, which is connected downstream of the collimators in the main emission direction, wherein the light guiding body has a light entry side, into which emitted light of the collimators can be injected, and a light exit side opposite the light entry side, from which the light injected via the light entry side exits, wherein the light guiding body is designed to project the light, which is directed in parallel by the collimators and injected into the light guiding body via the light entry side, in front of the optical device in the form of continuously closed light distribution in the main emission direction.

The light guiding bodies of an optical device for motor vehicle headlights disclosed in the prior art, which light guiding bodies are provided to fulfil crystal optics, are not able to produce continuously closed light distribution that meets the legal standards (for example in the ECE regulations) whilst at the same time maintaining the desired sparkle effect of the crystal optics.

SUMMARY OF THE INVENTION

It is therefore an object of the invention to provide an improved optical device.

This object is achieved by virtue of the fact that the light guiding body has a light shaping structure, which is formed from a plurality of interconnected facets, wherein the facets respectively have an inclination to the main emission direction, wherein the spatial vector of a facet, as seen in a correctly installed state of the projection device in a motor vehicle,

- forms a horizontal angle of inclination to the main emission direction and
- forms a vertical angle of inclination to the main emission direction, wherein the inclinations of all facets are distributed such that the horizontal angles of inclination and the vertical angles of inclination are respectively distributed around an expected value, wherein the expected value corresponds to the maximum luminous intensity of the light distribution in such a way that light that enters or leaves the light guiding body via facets that have a horizontal and vertical angle of inclination corresponding to the expected value forms the maximum luminous intensity of the light distribution, and wherein the light shaping structure forms the light entry side and/or the light exit side of the light guiding body, wherein the facets are arranged such that the facets are distributed substantially homogeneously on the light entry side and/or light exit side in relation to their respective inclinations.

It is therefore possible to keep the sparkle effect of the crystal optics and at the same time produce light distribution with a maximum luminous intensity. The light distribution that can be produced has a uniform gradual decrease in luminous intensity starting radially from the maximum luminous intensity. The light distribution can have isolux lines, which are arranged substantially round or circular around the maximum luminous intensity.

It can be provided that the facets of the light shaping structure are planar.

It can be provided that the inclinations of all facets are distributed such that the horizontal angles of inclination and the vertical angles of inclination are respectively normally distributed around an expected value.

It can be provided that the horizontal angles of inclination are normally distributed around an expected value equal to 0°.

It can be provided that the vertical angles of inclination are normally distributed around an expected value equal to 0°.

It can be provided that the facets are arranged with respect to one another such that they lie substantially in a common virtual area, wherein the virtual area is preferably flat.

It can be provided that the facets are arranged in a grid-like manner, preferable in rows and columns.

It can be provided that the projection device comprises additional light sources, which are designed to emit light in an additional light emission direction, wherein respectively at least one additional light source is associated with one collimator and is designed to inject light into the collimator, wherein the light of the additional light sources that can be emitted preferably has a different colour from the light sources.

It can be provided that the at least one additional light source of a collimator is arranged outside the focal point of the corresponding collimator such that the additional light emission direction forms a non-zero angle to the light emission direction of the light sources. This produces an additional sparkle effect of the light guiding body, wherein the light of the additional light sources is reflected as often as possible in the light guiding body owing to the oblique incidence of light on the collimator.

It can be provided that light parallelised by a collimator is injected into the light guiding body via a group of facets comprising at least two facets and/or exits the light guiding body.

This ensures that the luminous flux that can be produced is optimally used in order to produce the desired light distribution with the maximum luminous intensity with the desired sparkle effect of the light guiding body at the same time.

It can be provided that the size of the facets is distributed in such a way that sizes are respectively distributed around an expected value, preferably normally distributed.

This has the advantage of further increasing efficiency such that fewer surfaces have to be aligned to the expected value in order to create the desired light distribution.

It can be provided that the facets are substantially homogeneously distributed on the light entry side and/or light exit side in relation to their size.

It can be provided that the light shaping structure forms the light entry side, wherein the facets of the light shaping structure are arranged in a grid-like manner, preferably in rows and columns, wherein the light exit side is formed of facets, which facets are triangular and have an inclination to the main emission direction, wherein the inclination of the facets of the light exit side are distributed homogeneously, and wherein the facets of the light exit side are arranged such that the facets are distributed substantially homogeneously on the light exit side in relation to their respective inclinations.

The object is also achieved by a motor vehicle headlight, comprising at least one optical device according to the invention.

BRIEF DESCRIPTION OF THE DRAWINGS

The invention is explained below in more detail based on exemplary drawings. In the drawings.

In the following figures, unless otherwise stated, the same reference numbers denote the same features.

DETAILED DESCRIPTION OF EMBODIMENTS OF THE INVENTION

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

Figure 1:
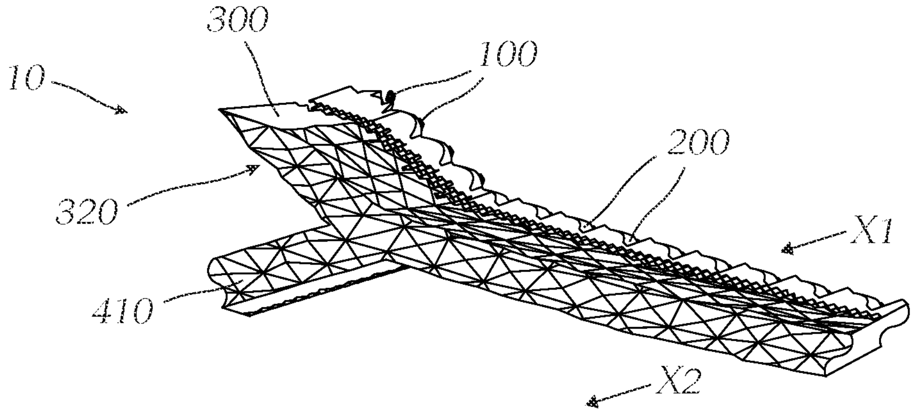
FIG. 1 shows a perspective front view of an optical device, which is designed to produce light distribution with a maximum luminous intensity, wherein the optical device comprises a light guiding body with a light entry and light exit side, wherein light from light sources directed in parallel by collimators can be injected into the light entry side and can exit the light exit side of the light guiding body, and wherein the light guiding body has a light shaping structure with a plurality of facets.

FIG. 1 shows an optical device 10 for a motor vehicle headlight for producing continuously closed light distribution 15, in particular daytime running light distribution, turn signal light distribution and/or tail light distribution, which light distribution has a maximum luminous intensity 16.

Figure 2A:
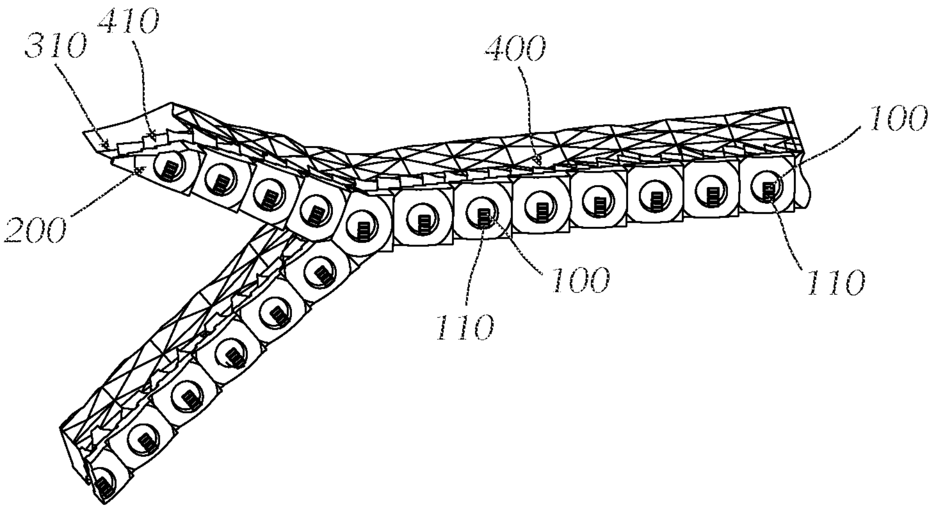
FIG. 2A shows a perspective rear view of the optical device from FIG. 1.
Figure 2B:
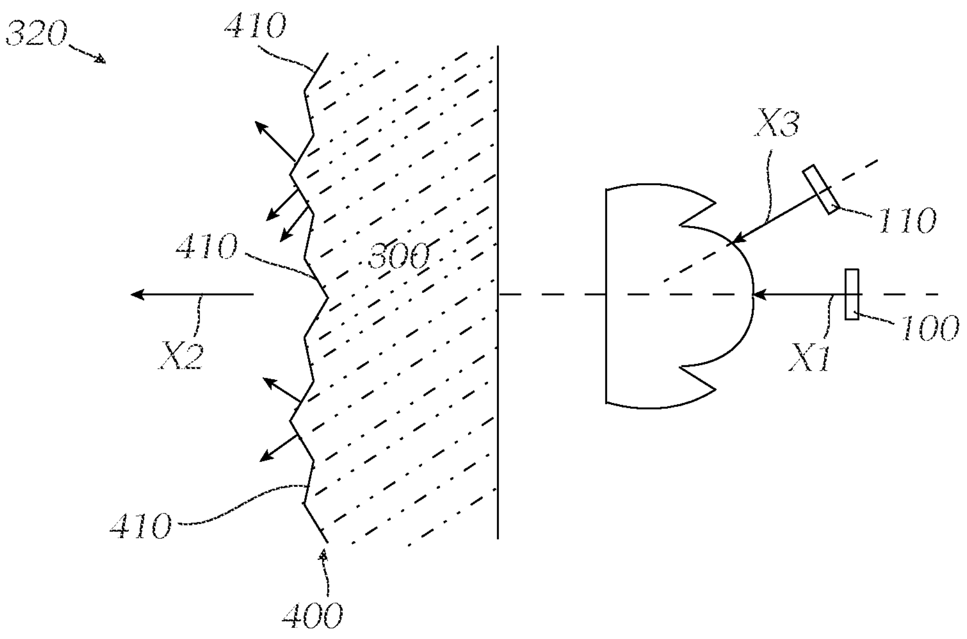
FIG. 2B shows a schematic cross-sectional view of the optical device from FIG. 1.
Figure 3:
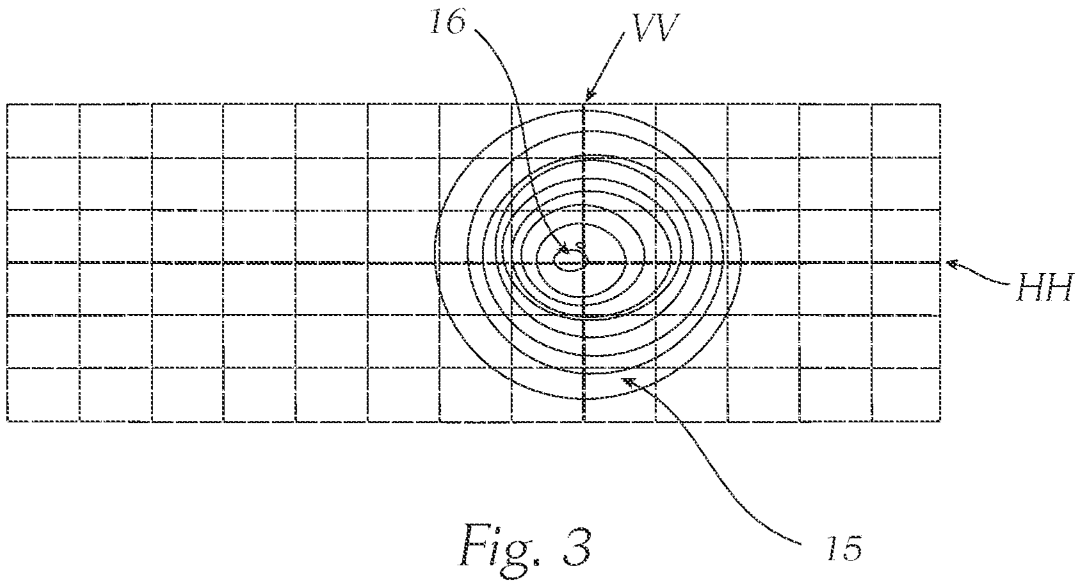
FIG. 3 shows the light distribution that can be produced by the optical device from FIG. 1 with a maximum luminous intensity.

The projection device 10 comprises light sources 100, which are designed to emit light in the light emission direction X1, as well as collimators 200, which are connected downstream of the light sources 100 in the light emission direction X1, wherein one collimator 200 is respectively associated with one light source 100 and is designed to direct the light of the light source 100 associated with the respective collimator 200 parallel to a main emission direction X2, wherein the collimators 200 and light sources 100 are illustrated more clearly in FIG. 2 and FIG. 3.

The optical device 10 further comprises a light guiding body 300, which is connected downstream of the collimators 300 in the main emission direction X2, wherein the light guiding body 300 has a light entry side 310, into which emitted light of the collimators 200 can be injected, and a light exit side 320 opposite the light entry side 310, from which the light injected via the light entry side 310 exits.

The light guiding body 300 is designed to project the light, which is directed in parallel by the collimators and injected into the light guiding body 300 via the light entry side 310, in front of the optical device 10 in the form of continuously closed light distribution 15 in the main emission direction X2.

The wording "continuously closed" in this context means that the light distribution has no holes, but rather is a continuous surface, as shown, for example, in FIG. 3 with an exemplary light distribution 15 with a maximum luminous intensity 16.

The light guiding body 300 has a light shaping structure 400, which is formed from a plurality of interconnected facets 410, wherein the facets 410 respectively have an inclination to the main emission direction X2, wherein the spatial vector A of a facet, as seen in a correctly installed state of the projection device 10 in a motor vehicle, forms a horizontal angle of inclination $\beta_{pH}$ to the main emission direction X2 and a vertical angle of inclination $\beta_V$ to the main emission direction X2. This also includes angles of inclination equal to zero.

Figure 4:
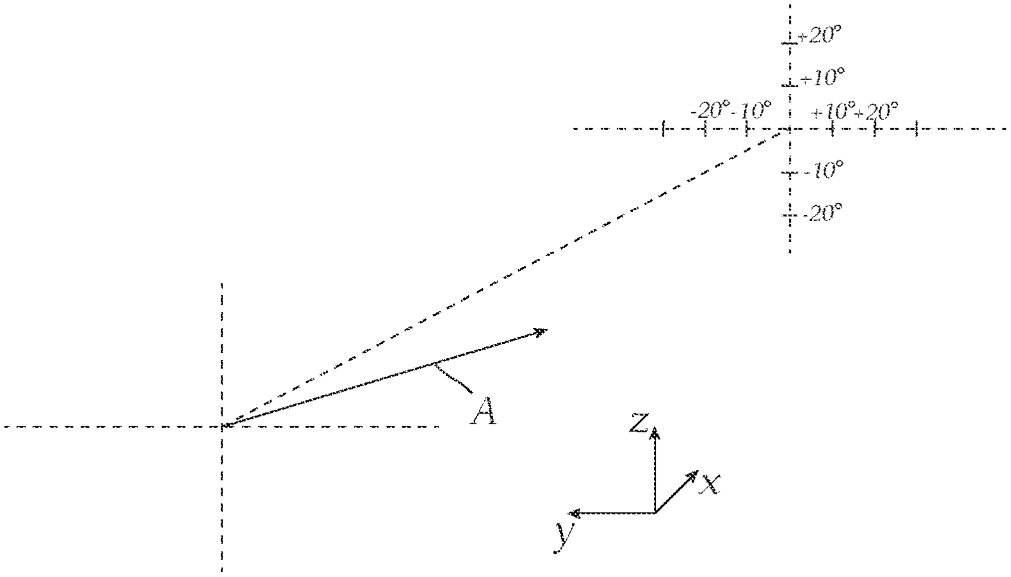
FIG. 4 shows a schematic drawing of the vertical and horizontal angle of inclination of the facets of the light shaping structure.
Figure 5A:
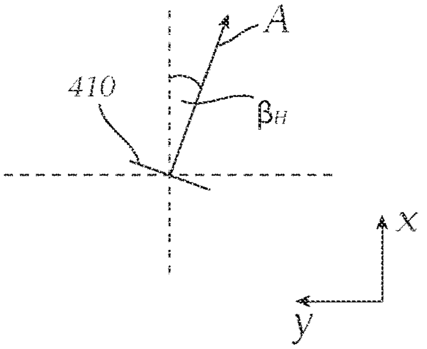
FIG. 5A shows a schematic illustration of an exemplary facet in a view from above.
Figure 5B:
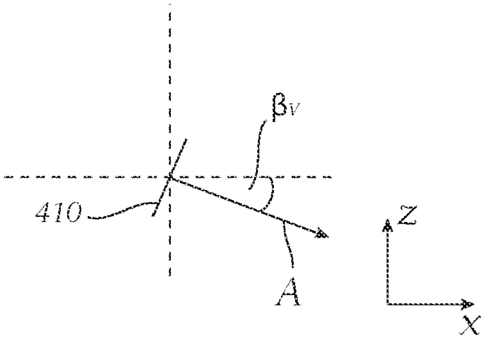
FIG. 5B shows a schematic illustration of an exemplary facet in a view from the side.

Illustrations of the horizontal and vertical angles of inclination $\beta_H$, $\beta_V$ are shown in FIG. 4, FIG. 5A and FIG. 5B, wherein FIG. 5A shows a horizontal angle of inclination $\beta_H$ and FIG. 5B shows a vertical angle of inclination $\beta_V$. FIG. 4 shows a facet with a horizontal and vertical angle of inclination greater than zero, wherein FIG. 4 also shows an exemplary schematic aiming screen in accordance with ECE guidelines (25 m away from the motor vehicle headlight) with angle information drawn on the HH and VV line.

The inclinations of all facets 410 of the light shaping structure 400 are distributed in such a way that the horizontal angles of inclination $\beta_H$ and the vertical angles of inclination $\beta_V$ are respectively distributed around an expected value, wherein the light shaping structure 400 forms the light exit side 320 of the light guiding body 300 in the examples shown in the figures. It is, however, also possible that the light shaping structure 400 forms the light entry side 310 of the light guiding body 300, or the light entry side 310 and the light exit side 320. The facets 410 are arranged in such a way that the facets 410 are substantially homogeneously distributed on the light entry side 310 and/or light exit side 320 in relation to their respective inclinations. The light parallelised by a collimator 200 is injected into the light guiding body 300 via a group of facets 410 comprising at least two facets 410 and/or exits the light guiding body 300.

The expected value corresponds to the maximum luminous intensity 16 of the light distribution 15 in such a way that light that enters or leaves the light guiding body 300 (depending on where the light shaping structure is arranged) via facets that have a horizontal and vertical angle of inclination corresponding to the expected value forms the maximum luminous intensity 16 of the light distribution 15.

The facets 410 of the light shaping structure 400 are planar, wherein the inclinations of all facets 410 in the examples shown are distributed in such a way that the horizontal angles of inclination $\beta_H$ and the vertical angles of inclination $\beta_V$ are respectively distributed around an expected value, wherein the horizontal angles of inclination $\beta_H$ are preferably normally distributed around an expected value equal to 0°, wherein the vertical angles of inclination $\beta_V$ are preferably normally distributed around an expected value equal to 0°.

In addition, the size of the facets 410 can be distributed in such a way that sizes are respectively distributed around an expected value, preferably normally distributed, wherein the facets 410 are substantially homogeneously distributed on the light entry side 310 and/or light exit side 320 in relation to their size.

Figure 6:
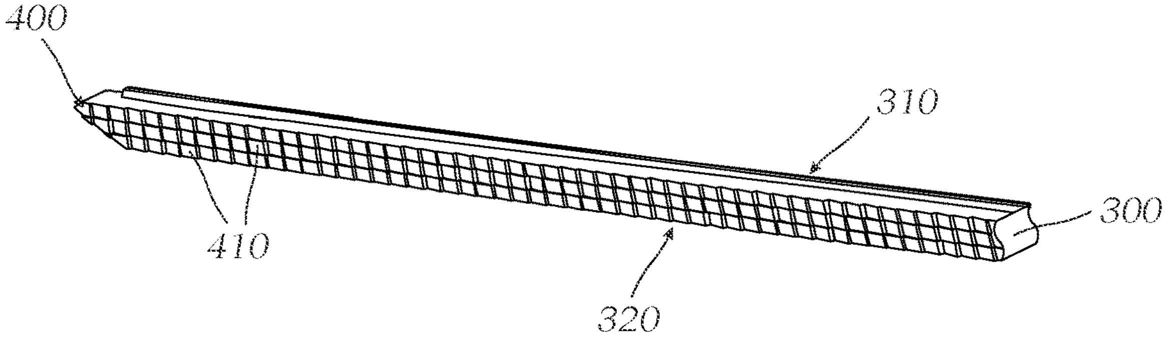
FIG. 6 shows a perspective view of a further exemplary light guiding body of an optical device.

Moreover, the facets 410 are arranged with respect to one another such that they lie substantially in a common virtual area, wherein the virtual area is flat, as shown, for example, in FIG. 1 or FIG. 6.

In the example shown in FIG. 6, the facets 410 are arranged in a grid-like manner, contrary to the examples in the other figures, such that the facets 410 are arranged in rows and columns.

Furthermore, the projection device 10 comprises additional light sources 110, which are designed to emit light in an additional light emission direction X3, wherein respectively at least one additional light source 110 is associated with one collimator 200 and is designed to inject light into the collimator 200, wherein the light of the additional light sources 110 that can be emitted has a different colour from the light sources 100. FIG. 2B clearly shows the additional light source 110.

The at least one additional light source 110 of a collimator 200 is arranged outside the focal point of the corresponding collimator 200 such that the additional light emission direction X3 forms a non-zero angle to the light emission direction X1 of the light sources 100, as also shown in FIG. 2B.

In another embodiment, which is not shown in the figures, the light shaping structure 400 forms the light entry side 310, wherein the facets 410 of the light shaping structure 400 are arranged in a grid-like manner, preferably in rows and columns, wherein the light exit side 320 is formed of facets, which facets are triangular and have an inclination to the main emission direction X2, wherein the inclination of the facets of the light exit side are distributed homogeneously, and wherein the facets of the light exit side 320 are arranged such that the facets are distributed substantially homogeneously on the light exit side 320 in relation to their respective inclinations. However, the above is also applicable to this embodiment.

REFERENCE LIST

Optical device . . . 10
Light distribution . . . 15
Maximum luminous intensity . . . 16
Light sources . . . 100
Additional light sources . . . 110
Collimators . . . 200
Light guiding body . . . 300
Light entry side . . . 310
Light exit side . . . 320
Light shaping structure . . . 400

Facets . . . 410
Horizontal angle of inclination . . . $\beta_H$
Vertical angle of inclination . . . $\beta_V$
Spatial vector . . . A
Light emission direction . . . X1
Main emission direction . . . X2
Additional light emission direction . . . X3

The invention claimed is:

1. An optical device (10) for a motor vehicle headlight for producing a continuously closed light distribution (15), which light distribution has a maximum luminous intensity (16), the optical device (10) comprising:

light sources (100), which are designed to emit light in a light emission direction (X1);

collimators (200), which are connected downstream of the light sources (100) in the light emission direction (X1), wherein one collimator (200) is respectively associated with one light source (100) and is designed to direct the light of the light source (100) associated with the respective collimator (200) parallel to a main emission direction (X2); and a light guiding body (300), which is connected downstream of the collimators (300) in the main emission direction (X2), wherein the light guiding body (300) has a light entry side (310), into which emitted light of the collimators (200) can be injected, and a light exit side (320) opposite the light entry side (310), from which the light injected via the light entry side (310) exits, wherein the light guiding body (300) is designed to project the light, which is directed in parallel by the collimators and injected into the light guiding body (300) via the light entry side (310), in front of the optical device (10) in the form of continuously closed light distribution (15) in the main emission direction (X2), wherein the light guiding body (300) has a light shaping structure (400), which is formed from a plurality of interconnected facets (410), wherein the facets (410) respectively have an inclination to the main emission direction (X2), wherein a spatial vector (A) of a facet, as seen in a correctly installed state of the optical device (10) in a motor vehicle, forms:

a horizontal angle of inclination ($\beta_H$) to the main emission direction (X2), and a vertical angle of inclination ($\beta_V$) to the main emission direction (X2), wherein the inclinations of all facets (410) are distributed such that the horizontal angles of inclination ($\beta_H$) and the vertical angles of inclination ($\beta_V$) are respectively distributed around an expected value, wherein the expected value corresponds to the maximum luminous intensity of the light distribution in such a way that light that enters or leaves the light guiding body (300) via facets that have a horizontal and vertical angle of inclination corresponding to the expected value forms the maximum luminous intensity of the light distribution, and wherein the light shaping structure (400) forms the light entry side (310) and/or the light exit side (320) of the light guiding body (300), wherein the facets (410) are arranged such that the facets (410) are distributed substantially homogeneously on the whole light entry side (310) and/or light exit side (320) in relation to their respective inclinations.

2. The optical device according to claim 1, wherein the facets (410) of the light shaping structure (400) are planar.

3. The optical device according to claim 1, wherein the inclinations of all facets (410) are distributed such that the horizontal angles of inclination ($\beta_H$) and the vertical angles of inclination ($\beta_V$) are respectively normally distributed around an expected value.

4. The optical device according to claim 1, wherein the horizontal angles of inclination ($\beta_H$) are normally distributed around an expected value equal to 0°.

5. The optical device according to claim 1, wherein the vertical angles of inclination ($\beta_V$) are normally distributed around an expected value equal to 0°.

6. The optical device according to claim 1, wherein the facets (410) are arranged with respect to one another such that they lie substantially in a common virtual area.

7. The optical device according to claim 6, wherein the virtual area is flat.

8. The optical device according to claim 1, wherein the facets (410) are arranged in a grid-like manner.

9. The optical device according to claim 8, wherein the facets (410) are arranged in rows and columns.

10. The optical device according to claim 1, wherein the optical device (10) comprises additional light sources (110), which are designed to emit light in an additional light emission direction (X3), wherein respectively at least one additional light source (110) is associated with one collimator (200) and is designed to inject light into the collimator (200).

11. The optical device according to claim 10, wherein the light of the additional light sources (110) that can be emitted has a different colour from the light sources (100).

12. The optical device according to claim 10, wherein the at least one additional light source (110) of a collimator (200) is arranged outside the focal point of the corresponding collimator (200) such that the additional light emission direction (X3) forms a non-zero angle to the light emission direction (X1) of the light sources (100).

13. The optical device according to claim 1, wherein light parallelised by a collimator (200) is injected into the light guiding body (300) via a group of facets (410) comprising at least two facets (410) and/or exits the light guiding body (300).

14. The optical device according to claim 1, wherein the size of the facets (410) is distributed in such a way that sizes are respectively distributed around an expected value.

15. The optical device according to claim 14, wherein the facets (410) are substantially homogeneously distributed on the light entry side (310) and/or light exit side (320) in relation to their size.

16. The optical device according to claim 14, wherein the sizes are normally distributed around the expected value.

17. The optical device according to claim 1, wherein the light shaping structure (400) forms the light entry side (310), wherein the facets (410) of the light shaping structure (400) are arranged in a grid-like manner, wherein the light exit side (320) is formed of facets, which facets are triangular and have an inclination to the main emission direction (X2), wherein the inclination of the facets of the light exit side are distributed homogeneously, and wherein the facets of the light exit side (320) are arranged such that the facets are distributed substantially homogeneously on the light exit side (320) in relation to their respective inclinations.

18. The optical device according to claim 17, wherein the facets (410) of the light shaping structure (400) are arranged in rows and columns.

19. A motor vehicle headlight comprising at least one optical device (10) according to claim 1.

20. The optical device according to claim 1, wherein the light distribution is a daytime running light distribution, a turn signal light distribution, and/or a tail light distribution.

* * * * *